United States Patent
Fordice et al.

(10) Patent No.: US 9,417,151 B2
(45) Date of Patent: Aug. 16, 2016

(54) CENTER OF GRAVITY DETERMINATION

(75) Inventors: Robert D. Fordice, Shoreline, WA (US); Daniel J. Wright, Mercer Island, WA (US); Donald G. Morris, Seattle, WA (US); Nathan A. Fabro, Seattle, WA (US)

(73) Assignee: The Boeing Company, Chicago, IL (US)

(*) Notice: Subject to any disclaimer, the term of this patent is extended or adjusted under 35 U.S.C. 154(b) by 941 days.

(21) Appl. No.: 13/305,240

(22) Filed: Nov. 28, 2011

(65) Prior Publication Data

US 2013/0138376 A1      May 30, 2013

(51) Int. Cl.
| | |
|---|---|
| G01C 7/00 | (2006.01) |
| G01C 7/02 | (2006.01) |
| G01P 3/02 | (2006.01) |
| G01C 7/04 | (2006.01) |
| G01M 1/12 | (2006.01) |

(52) U.S. Cl.
CPC ..................................... *G01M 1/122* (2013.01)

(58) Field of Classification Search
CPC .................................................. G01M 13/027
USPC ............. 702/87, 97, 141, 150, 152, 155, 156, 702/159; 382/107; 700/275; 701/36
See application file for complete search history.

(56) References Cited

U.S. PATENT DOCUMENTS

| | | | | |
|---|---|---|---|---|
| 5,214,749 A | * | 5/1993 | Brown ........................... | 700/260 |
| 5,387,071 A | * | 2/1995 | Pinkston ....................... | 414/563 |
| 5,764,786 A | * | 6/1998 | Kuwashima et al. ......... | 382/107 |
| 6,678,633 B2 | | 1/2004 | Hessmert et al. | |
| 6,952,628 B2 | | 10/2005 | Prutu | |
| 7,415,866 B2 | | 8/2008 | Latiri | |
| 7,579,986 B2 | | 8/2009 | DiEsposti | |
| 7,865,296 B2 | | 1/2011 | Ryu et al. | |
| 8,322,968 B1 | * | 12/2012 | Mizner ......................... | 414/635 |
| 8,504,208 B2 | * | 8/2013 | Orita ............................. | 700/275 |

(Continued)

FOREIGN PATENT DOCUMENTS

| | | |
|---|---|---|
| CN | 101487755 A | 7/2009 |
| DE | 3440571 A1 | 11/1985 |

OTHER PUBLICATIONS

Boynton, R., "Measuring weight and all three axes of the center of gravity of a rocket motor without having to re-position the motor," Paper No. 3238, May 18, 2002, Society of Allied Weight Engineers, Inc., Los Angeles, California, 22 pages.

(Continued)

*Primary Examiner* — Gregory J Toatley
*Assistant Examiner* — Felix Suarez
(74) *Attorney, Agent, or Firm* — Toler Law Group, PC

(57) ABSTRACT

In one embodiment a method to determine a center of gravity of a three dimensional object comprises positioning the object on a test platform in a first orientation, determining a position of the center of gravity along a first axis and a second axis when the object is in the first orientation, rotating the object with respect to a third axis which is orthogonal to the first axis and the second axis, determining a position of the center of gravity along at least one of the first axis or the second axis when the object is in the second orientation, and using a change in the position of the center of gravity along the at least one of the first axis or the second axis when the object is in the second orientation to determine a position of the center of gravity along the third axis. Other embodiments may be described.

19 Claims, 6 Drawing Sheets

(56) References Cited

U.S. PATENT DOCUMENTS

| | | |
|---|---|---|
| 2008/0143605 A1 | 6/2008 | Bornholdt |
| 2008/0146246 A1 | 6/2008 | Bornholdt |
| 2009/0174597 A1 | 7/2009 | DiLellio et al. |
| 2009/0228210 A1 | 9/2009 | Gutt |
| 2009/0315764 A1 | 12/2009 | Cohen et al. |
| 2009/0315769 A1 | 12/2009 | Whelan et al. |
| 2010/0070132 A1* | 3/2010 | Doi .................................. 701/36 |
| 2010/0290030 A1 | 11/2010 | Groitzsch et al. |
| 2011/0138892 A1 | 6/2011 | Lucas et al. |

OTHER PUBLICATIONS

Extended European Search Report for Application No. 12194705.5 mailed Feb. 3, 2014, 14 pages.

* cited by examiner

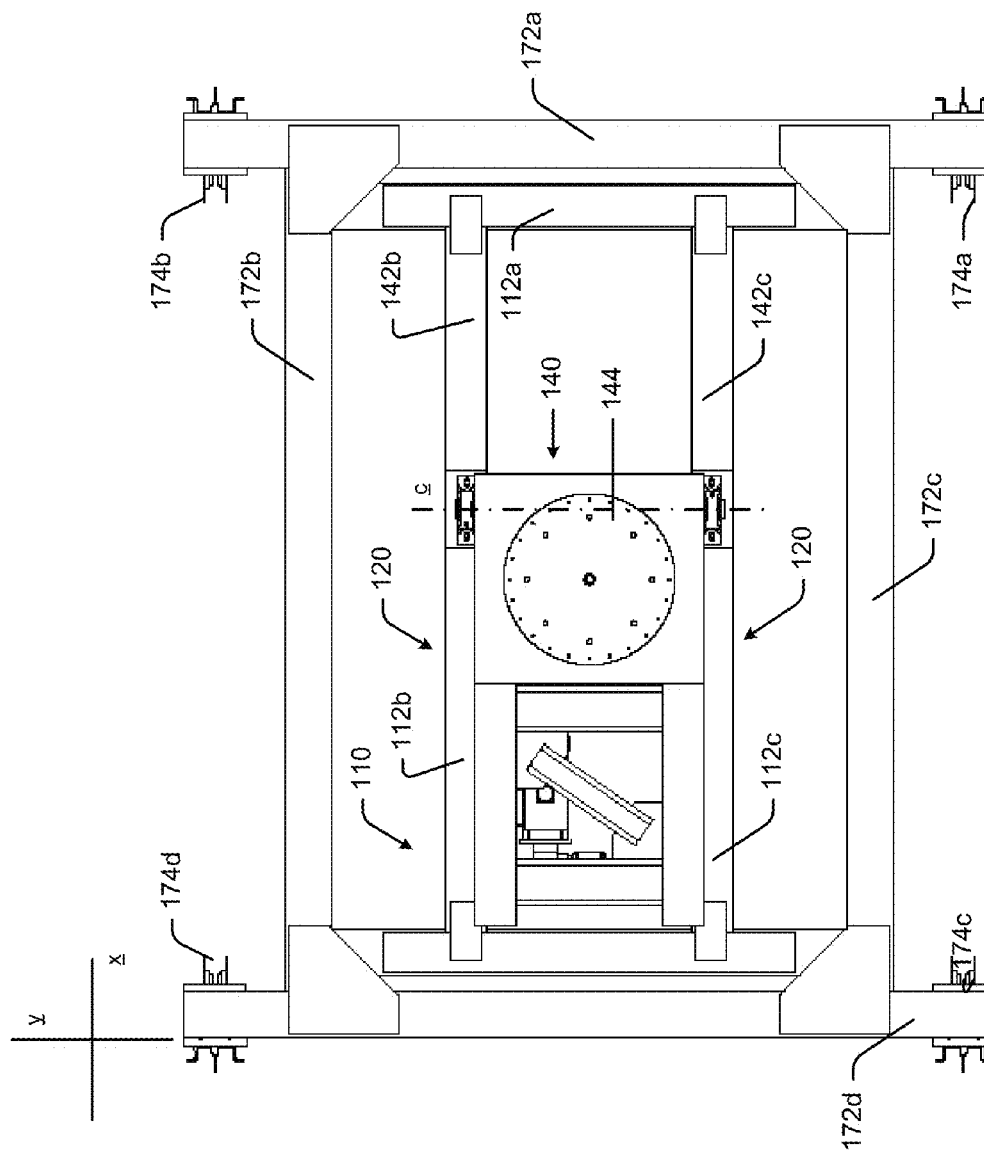

CENTER OF GRAVITY DETERMINATION

FIELD OF THE DISCLOSURE

This invention relates to testing and evaluation of objects and to systems and methods to determine the center of gravity of an object under testing and evaluation.

BACKGROUND

Various applications may benefit from an ability to determine the center of gravity of an object which may be of an irregular shape, volume, and mass. One exemplary application from the aerospace industry relates to radar cross-section testing, during which objects such as a complete aircraft, models thereof, or components thereof may be mounted on a pylori and positioned in a radar test field. In order to balance the object on the pylori it is useful to position the object such that the object's center of gravity is disposed proximate a longitudinal axis that extends through the pylori. Thus, systems and methods to determine the center of gravity of the test object may find utility.

SUMMARY

In various aspects, systems and methods to determine the center of gravity of a device are provided. In some embodiments, systems and methods as described herein first locate the center of gravity of a test object in two axes when the object is positioned in a first orientation. The object is then rotated with respect to a third axis into a second orientation and the center of gravity is determined in at least one of the two axes. A change in the center of gravity between the first orientation and the second orientation may be used to determine the center of gravity along the third axis. In an exemplary system the first and second axes are X and Y axes, and the third axis is a Z axis.

Thus, in one embodiment there is provided a method to determine a center of gravity of a three dimensional object comprises positioning the object on a test platform in a first orientation, determining a position of the center of gravity along a first axis and a second axis when the object is in the first orientation, rotating the object with respect to a third axis which is substantially orthogonal to the first axis and the second axis, determining a position of the center of gravity along at least one of the first axis or the second axis when the object is in the second orientation, and using a change in the position of the center of gravity along the at least one of the first axis or the second axis when the object is in the second orientation to determine a position of the center of gravity along the third axis.

In another embodiment there is provided a system to determine a center of gravity of a three dimensional object, comprising a frame, a test platform coupled to the frame and upon which the object may be mounted. In some embodiments the test platform is rotatable relative to the frame about an axis between a first position in which the object is in a first orientation and a second position in which the object is in a second orientation. The system further comprises at least three load cells coupled to the test platform to collect mass data related to an object positioned on the test platform and a computer-based processing device coupled to the at least three load cells. The computer-based processing device comprises logic instruction stored in a non-transitory computer readable medium which, when executed by the processing device, configures the processing device to receive a first data set from the at least three load cells when the object is positioned on the test platform in the first orientation, determine a position of the center of gravity along a first axis and a second axis when the object is in the first orientation, and receive a second data set from the at least three load cells when the object is positioned on the test platform in the second orientation, determine a position of the center of gravity along at least one of the first axis or the second axis when the object is in the second orientation, and use a change in the position of the center of gravity along the at least one of the first axis or the second axis when the object is in the second orientation to determine a position of the center of gravity along the third axis.

In another embodiment there is provided a computer-based system to determine a center of gravity of a three dimensional object comprising a non-transitory memory module, a computer-based processing device coupled to memory, and logic instruction stored in the non-transitory memory module which, when executed by the processing device, configures the processing device to receive a first data set from at least three load cells coupled to a test platform holding a the object in a first orientation, determine a position of the center of gravity along a first axis and a second axis in three dimensional space when the object is in the first orientation, receive a second data set from the at least three load cells when the object is positioned on the test platform in a second orientation, different from the first orientation, determine a position of the center of gravity along at least one of the first axis or the second axis when the object is in the second orientation, and use a change in the position of the center of gravity along the at least one of the first axis or the second axis when the object is in the second orientation to determine a position of the center of gravity along the third axis.

The features, functions and advantages discussed herein can be achieved independently in various embodiments described herein or may be combined in yet other embodiments, further details of which can be seen with reference to the following description and drawings.

BRIEF DESCRIPTION OF THE DRAWINGS

The detailed description is described with reference to the accompanying figures.

FIG. 3 is a schematic, top view of a system for center of gravity determination in accordance with some embodiments.

DETAILED DESCRIPTION

Described herein are exemplary systems and methods for center of gravity determination. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
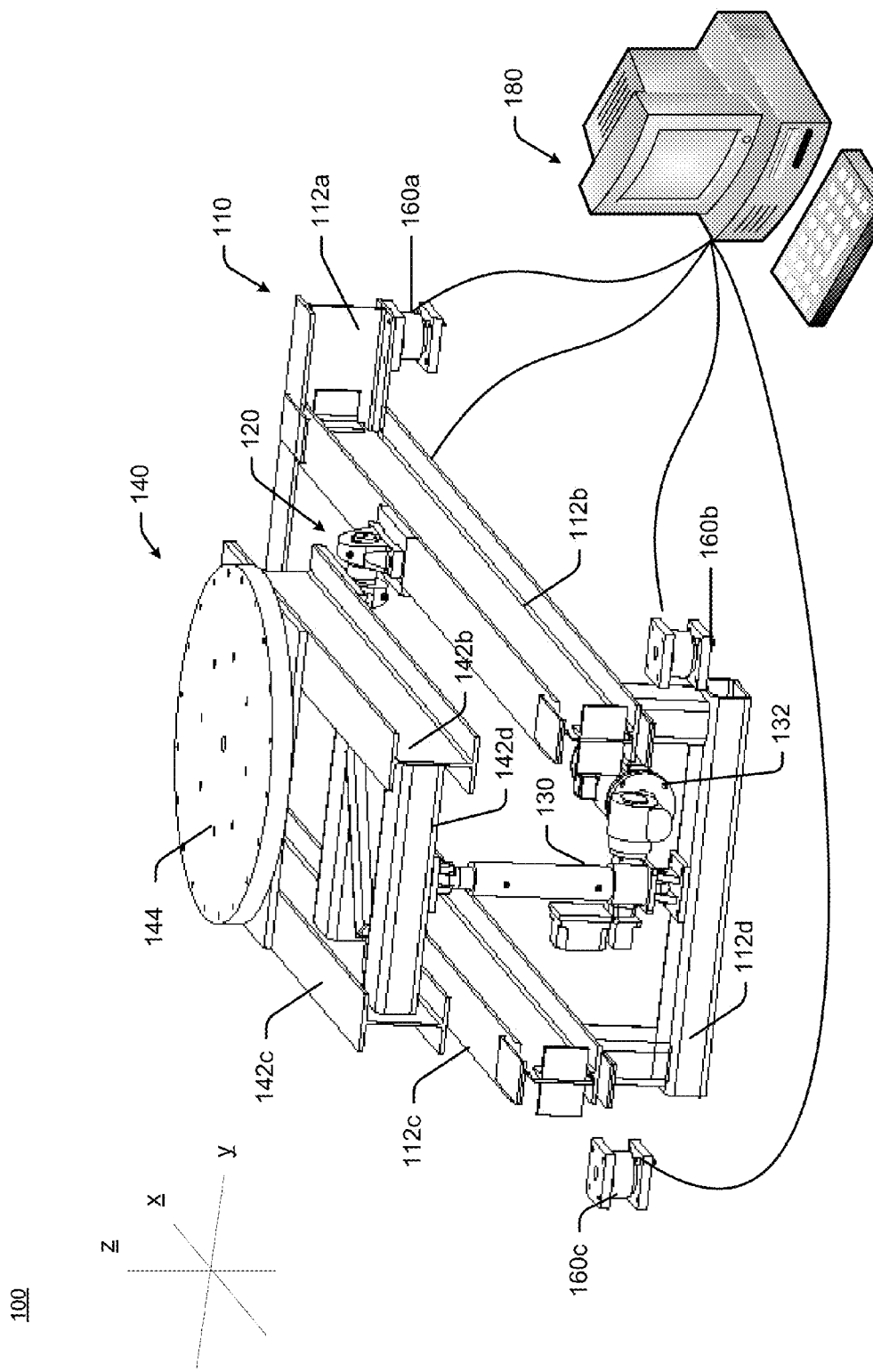
FIGS. 1 and 2 are schematic, perspective views of a system for center of gravity determination in accordance with some embodiments.
Figure 2:
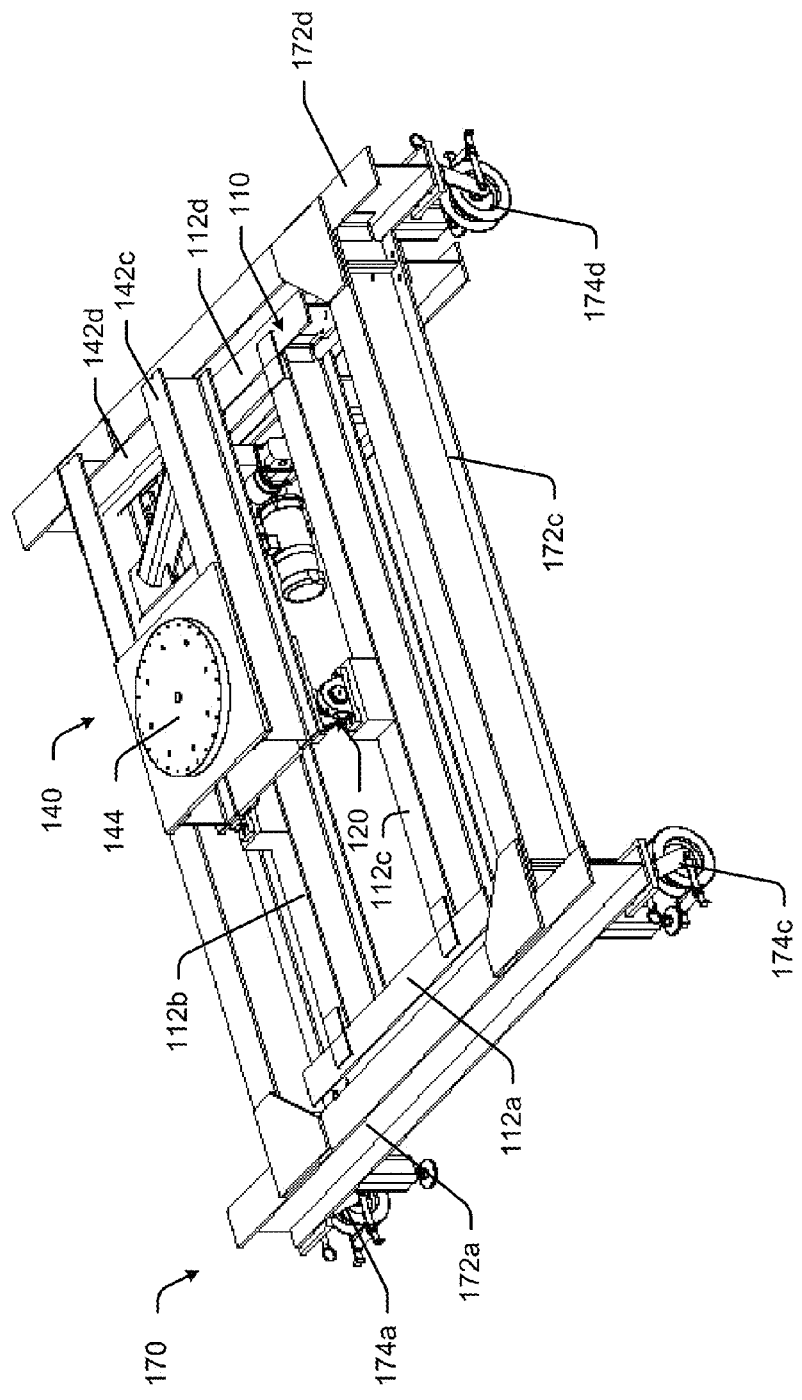

FIGS. 1 and 2 are schematic, perspective views of a system for center of gravity determination in accordance with some embodiments, and FIG. 3 is a schematic, top view of a system for center of gravity determination in accordance with some embodiments. Referring to FIGS. 1-3, in one embodiment a wire detection system 100 comprises a frame 110, a test platform 140 coupled to the frame 110 and upon which the object may be mounted. The test platform 140 may be rotated relative to the frame 110 about an axis between a first position in which the object is in a first orientation and a second position in which the object is in a second orientation. The system 100 further comprises at least three load cells 160 coupled to the frame 110 to collect mass data related to an object positioned on the test platform 140, and a computer-based processing device 180 coupled to the at least three load cells.

In greater detail, in the embodiment depicted in FIGS. 1-3 the frame 110 comprises a four crossbars 112a, 112b, 112c, 112d formed from a suitable material such as, e.g. steel, aluminum, or the like. Crossbars 112a, 112b, 112c, 112d, which may be referred to collectively herein by reference numeral 112, are connected to form a rigid, rectangular structure. One skilled in the art will recognize that the crossbars could be formed from other materials in alternate geometric shapes.

A test platform 140 is mounted to the crossbars 114, 116 and is supported on a first end by a hinge assembly 120 and on an opposing end by a hoist 130. In the embodiment described herein test platform 140 also comprises four crossbars 142a, 142b, 142c, 142d formed from a suitable material such as, e.g. steel, aluminum, or the like. Crossbars 142a, 142b, 142c, 142d, which may be referred to collectively herein by reference numeral 142, are connected to form a rigid, rectangular structure. One skilled in the art will recognize that the crossbars could be formed from other materials in alternate geometric shapes.

Test platform 140 further comprises a mounting pad 144 onto which an object may be mounted. In the embodiment depicted here the mounting pad is a substantially circular structure steel pad mounted on the crossbars 142b, 142c. One skilled in the art will recognize that the mounting pad 144 could be formed from other materials in alternate geometric shapes.

Hoist 130 is mounted between crossbar 112d and crossbar 142d and functions to raise and lower crossbar 142d, thereby rotating platform 140 about the C-axis extending through the hinge assembly 120. Hoist 130 may be embodied as a hydraulic hoist, an electric hoist, or the like. In the embodiment depicted herein hoist 130 is coupled to motor 132 which raises and lowers the hoist 130 to rotate platform 140 relative to the frame 110.

A plurality of load cells 160a, 160b, 160c, 160d, which may be referred to collectively by reference numeral 160, are coupled to the frame 110 to collect data from loads positioned on the frame 110. In one embodiment four load cells are mounted on frame 110. Load cells 160a, 160b, 160c are visible in FIG. 1. Load cell 160d is behind platform 140 in the perspective view of FIG. 1 and is therefore not visible. Load cells 160 generate an output which is proportional to the force applied to the load cell. Outputs from load cells 160 may be amplified or otherwise processed and input to a computer-based processing device 180.

Referring to FIGS. 2-3, in some embodiments the frame 110 may be mounted on a cart 170 such that the entire system 100 is mobile. Cart 170 comprises a four crossbars 172a, 172b, 172c, 172d formed from a suitable material such as, e.g. steel, aluminum, or the like. Crossbars 172a, 172b, 172c, 172d, which may be referred to collectively herein by reference numeral 172, are connected to form a rigid, rectangular structure. One skilled in the art will recognize that the crossbars could be formed from other materials in alternate geometric shapes. Frame 170 is mounted on wheels 174a, 174b, 174c, 174d, which may be referred to collectively herein by reference numeral 174, and which are adapted to rest upon a ground surface.

A coordinate system may be mapped onto the three-dimensional space surrounding the platform 140. In one embodiment a Cartesian coordinate system may be used to map the space, with the x-axis extending in a direction substantially parallel to the crossbar 112c, the y-axis substantially parallel to the crossbar 112a, and the z-axis substantially perpendicular to the plane defined by the x-axis and the y-axis. It may be preferable for certain applications that the plane defined by the x-axis and the y-axis are parallel or substantially parallel to the ground surface, upon which the platform 140 rests. In other embodiments the origin of the coordinate system may be placed at load cell 160b. One skilled in the art will recognize that the particular coordinate system is not critical to the invention and that the space may be mapped using alternate coordinate systems, e.g., polar coordinates, and that the orientation of the coordinate system may be rotated or translated.

Figure 5:
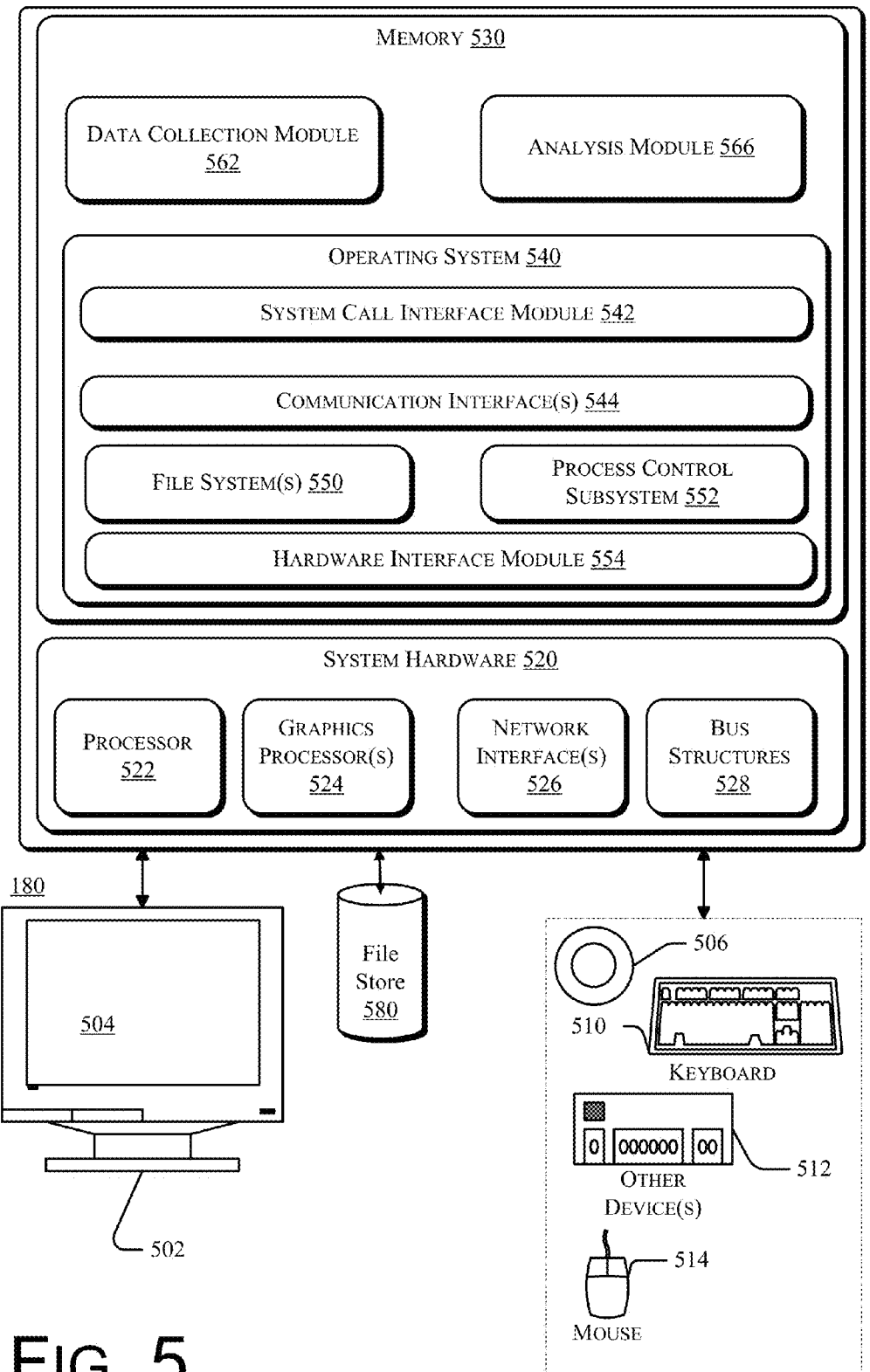
FIG. 5 is a schematic illustration of a computing system in which portions of a system for center of gravity determination may be implemented according to embodiments.

FIG. 5 is a schematic illustration of a computing system 180 which may be adapted to implement center of gravity determination, according to one or more of the embodiments described herein. Referring to FIG. 5, in one embodiment, system 180 may include one or more accompanying input/output devices including a display 502 having a screen 504, one or more speakers 506, a keyboard 510, one or more other I/O device(s) 512, and a mouse 514. The other I/O device(s) 512 may include a touch screen, a voice-activated input device, a track ball, and any other device that allows the system 180 to receive input from a user.

The system 180 includes system hardware 520 and memory 530, which may be implemented as random access memory and/or read-only memory. A file store 580 may be communicatively coupled to system 180. File store 580 may be internal to computing device 508 such as, e.g., one or more hard drives, CD-ROM drives, DVD-ROM drives, or other types of storage devices. File store 580 may also be external to computer 508 such as, e.g., one or more external hard drives, network attached storage, or a separate storage network.

System hardware 520 may include one or more processors 522, at least two graphics processors 524, network interfaces 526, and bus structures 528. In one embodiment, processor 522 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processors 524 may function as adjunct processors that manage graphics and/or video operations. Graphics processors 524 may be integrated onto the motherboard of computing system 500 or may be coupled via an expansion slot on the motherboard.

In one embodiment, network interface 526 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 528 connect various components of system hardware 128. In one embodiment, bus structures 528 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 530 may include an operating system 540 for managing operations of computing device 508. In one embodiment, operating system 540 includes a hardware interface module 554 that provides an interface to system hardware 520. In addition, operating system 540 may include a file system 550 that manages files used in the operation of computing device 508 and a process control subsystem 552 that manages processes executing on computing device 508.

Operating system 540 may include (or manage) one or more communication interfaces that may operate in conjunction with system hardware 120 to transceive data packets and/or data streams from a remote source. Operating system 540 may further include a system call interface module 542 that provides an interface between the operating system 540 and one or more application modules resident in memory 530. Operating system 540 may be embodied as a UNIX operating system or any derivative thereof (e.g., Linux, Solaris, etc.) or as a Windows® brand operating system, or other operating systems.

In various embodiments, the system 180 may be embodied as a personal computer, a laptop computer, a personal digital assistant, a mobile telephone, an entertainment device, or another computing device.

In one embodiment, memory 530 includes one or more logic modules embodied as logic instructions encoded on a tangible, non transitory memory to impart functionality to the system 180. The embodiment depicted in FIG. 5 comprises a data collection module 562, and an analysis module 564. Additional details about the process and operations implemented by these modules are described with reference to FIGS. 4A-4B, and FIG. 6 below.

In operation, the system 100 may be employed to determine the center of gravity in three-dimensional space of an object mounted on the platform. The object may be irregular in shape, volume, density, and distribution of mass. In brief overview, in one embodiment an object may be positioned on the platform 140 when the platform 140 is in a first position substantially parallel with the frame. The data collection module 562 collects data from the load cells 160 and the analysis module 566 uses the data collected from the load cells 160 to determine the center of gravity along the X-axis and Y-axis. The hoist 130 is then activated to rotate the object through a predetermined angular range of motion, thereby shifting the center of gravity of the object along the X-axis. The change in the position of the center of gravity along the X-axis may then be used to determine a position of the center of gravity of the object in the Z-axis.

Figure 4A:
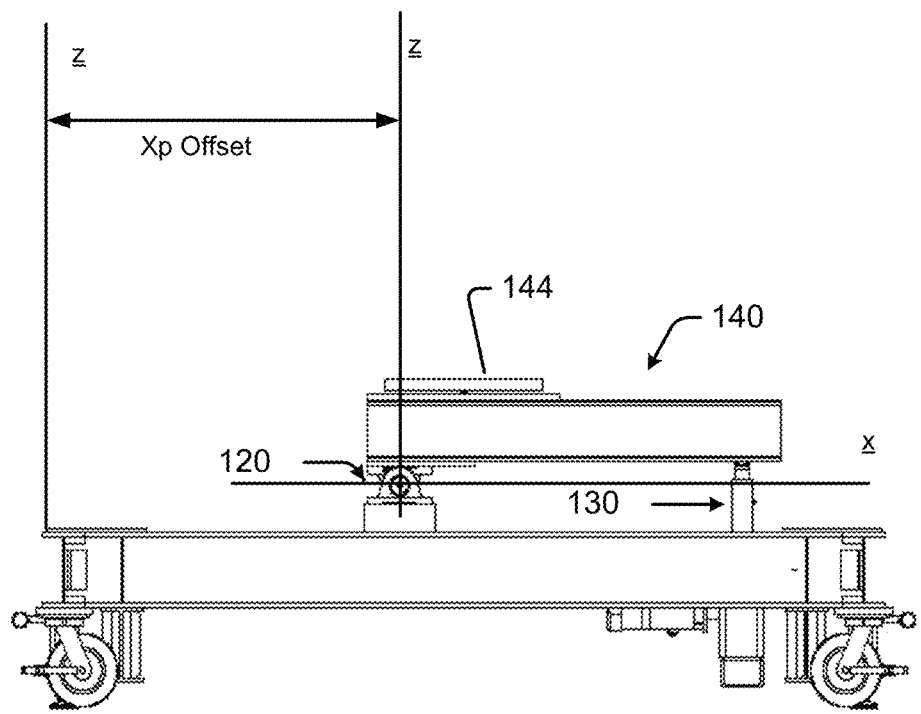
FIG. 4 is schematic, side view of a system for center of gravity determination in accordance with some embodiments
Figure 6:
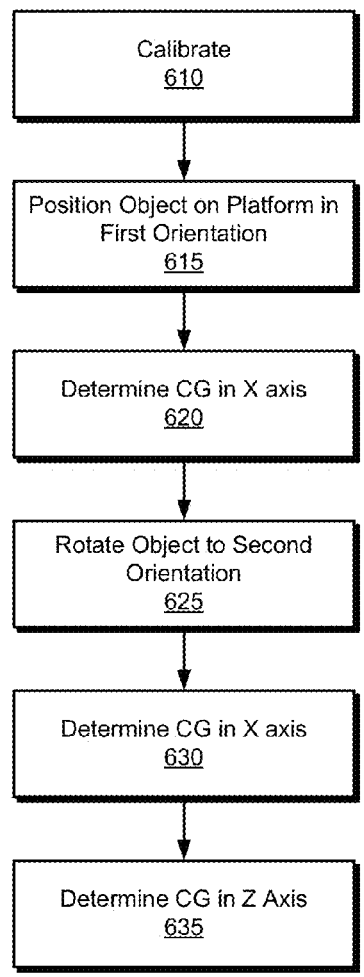
FIG. 6 is a flowchart illustrating operations in a method of center of gravity determination, according to embodiments.

In greater detail, and referring to FIG. 6, in some embodiments a calibration process may be implemented to determine the center of gravity of the platform 140 when the platform is in a substantially flat orientation, as depicted in FIG. 4A. By way of example, the system 100 may be activated and the data collection module 562 collects force data from each load cell 160. The analysis module 562 then calculates the gravitational center of the platform 140 in the X-axis as follows:

$$Xrig_{zero} = \frac{L*(M_a + M_d)}{M_a + M_b + M_c + M_d}$$ EQ 1

Where L is the distance between load cells 160a and 160b or between 160c and 160d and $M_a$, $M_b$, $M_c$, and $M_d$ represent the measured loads at each of the load cells 160a through 160d.

The following variables are recorded:

Xp_offset: The distance along the X-axis from the origin to the C-axis extending through the hinge pivot point, 120.

Zp_offset: The distance along the Z-axis from the origin to the C-axis extending through the hinge pivot point, 120.

Za: The distance along the Z-axis from the C-axis extending through the hinge pivot point, 120, to the plane of the attachment point, 144.

M_rig: The total mass of the assembled structures 100 and 140 equal to the sum of load cells 160a, 160b, 160c and 160d.

X_rig_zero: The center of gravity along the X-axis of the combined structure 100 and 140 at zero tilt angle calculated from Equation 1.

The hoist is then activated to rotate platform 140 through a predetermined angle θ about a C-axis extending through the hinge assembly 120. In some embodiments the predetermined angle θ measures between 1 degree and 10 degrees, although angles greater than 10 degrees may be used. The angle θ may be determined using an inclinometer or similar instrument. The center of gravity of the platform 140 along the X-axis is then calculated using Equation (1) above. This results in a mapping between the predetermined angle of rotation θ and the X-axis center of gravity, X_rig_angle. This mapping may be stored in a memory module.

In some embodiments a single angle of rotation θ may be used. In other embodiments the calibration process may rotate the platform incrementally through a range of predetermined angles θ and may record the X-axis center of gravity, X_rig_angle at each rotation angle θ. The values may be stored in a data table or other suitable data structure in memory 530 of system 180, or in the file store 580 coupled to system 180.

Once the calibration data is stored in memory the system 100 may be used to determine the center of gravity of an object mounted on platform 140. Thus, at operation 615 an object is positioned on the platform when the platform is in a first position. In some embodiments the first position corresponds to the platform being positioned substantially parallel to the frame 110, i.e., a rotation angle θ of zero degrees. The mass of the model is determined by:

$$m_{model} = m_{tot} - m_{rig}$$ EQ 2

Where $m_{model}$ represents the mass of the object mounted on the platform 110, $m_{tot}$ represents the total mass measured by the load cells 160, and $m_{rig}$ represents the mass of the platform 140 measured by the load cells 160 during the calibration process.

At operation 620 the X-axis center of gravity of the object relative to the pivot point defined by the C-axis extending through the hinge assembly 120 may then be calculated using the equation:

$$x_{m_{zero}} = \frac{x_{tot_{zero}} \cdot m_{tot} - x_{rig_{zero}} \cdot m_{rig}}{m_{model}} \quad \text{EQ 3}$$

Where $x_{mzero}$ represents the X-axis center of gravity of the object when the platform is not rotated, i.e., at a rotation angle of zero degrees, $x_{totzero}$ represents the x-axis center of gravity of the object and the platform when the platform is not rotated, i.e., at a rotation angle of zero degrees, and $x_{rigzero}$ represents the x-axis center of gravity of the platform when the platform is not rotated, i.e., at a rotation angle of zero degrees.

At operation 625 the object is rotated to a second orientation by activating the hoist assembly to rotate the platform 140 about the C-axis extending through the hinge assembly 120 to the predetermined rotation angle θ at which the platform was calibrated in operation 610.

At operation 630 the center gravity of the object relative to the pivot point may then be calculated using the equation:

$$x_{m_{angle}} = \frac{x_{tot_{angle}} \cdot m_{tot} - x_{rig_{angle}} \cdot m_{rig}}{m_{model}} \quad \text{EQ 4}$$

Where $x_{mangle}$ represents the X-axis center of gravity of the object when the platform is rotated at the rotation angle of θ degrees, $x_{totangle}$ represents the x-axis center of gravity of the object and the platform when the platform is rotated at the rotation angle of θ degrees, and $x_{rigangle}$ represents the x-axis center of gravity of the platform when the platform rotated at the rotation angle of θ degrees.

Figure 7:
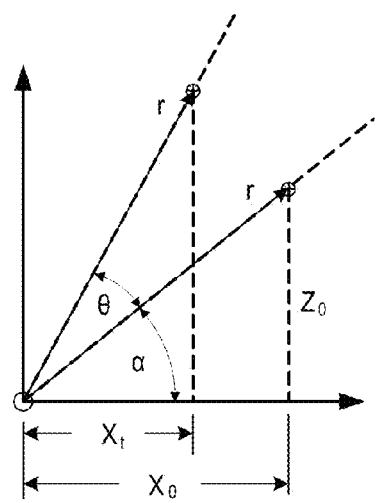
FIG. 7 is a schematic illustration of a geometric model for center of gravity determination according to embodiments.

At operation 635 the changes in the X-axis center of gravity may be used to determine the center of gravity of the object along a Z-axis, substantially orthogonal to the plane defined by the X-axis and the Y-axis. FIG. 7 is a schematic illustration of a geometric model for center of gravity determination according to embodiments. Referring to FIG. 7, in some embodiments the center of gravity in the Z-axis may be determined using the equation:

$$Zcg_{attach} = Xo \sqrt{\left(\frac{1}{\cos^2\left\{\tan^{-1}\left(\frac{Xo\cos(\theta) - Xt}{Xo\sin(\theta)}\right)\right\}} - 1\right)} - Za \quad \text{EQ 5}$$

Where $Z_{cgatttach}$ represents the Z-axis center of gravity of the object measured with reference to an attachment point of the platform, $X_0$ represents the X-axis center of gravity of the object when the platform 140 is in the initial position, i.e., disposed at a rotation angle of zero degrees, $X_t$ represents the X-axis center of gravity when the platform 140 is in the second position, i.e., disposed at a rotation angle of θ. In some embodiments the attachment point may be displaced from the pivot point defined by the C-axis extending through the hinge assembly 140 by a distance a along the Z-axis. Thus, the term Za represents the displacement of attachment point from the pivot point along the Z-axis.

Figure 4B:
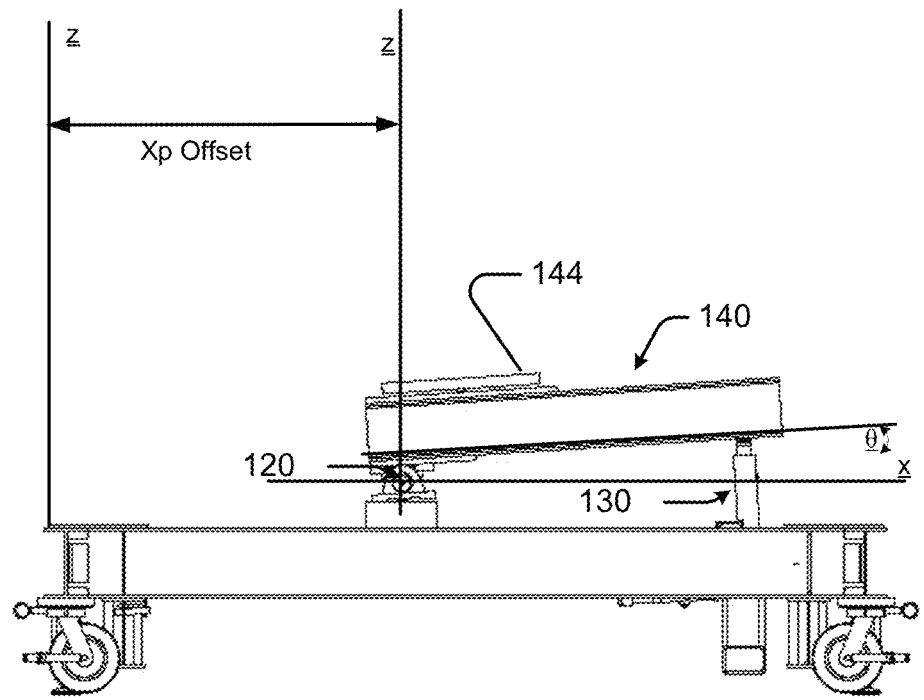

The model depicted in FIG. 7 calculates the Z-axis center of gravity using a coordinate system positioned at the attachment point. In some embodiments it may be useful to translate the coordinate system to a reference position measured from an edge of the platform, as illustrated in FIGS. 3 and 4A-4B. In such a coordinate system the X-axis may be translated by an amount representing the pivot offset along the X-axis, represented by Xp Offset in FIGS. 4A and 4B.

In this coordinate system the X-axis center of gravity of the object oriented in the first position i.e., disposed at a rotation angle of zero degrees may be determined as follows:

$$Xm_{zero\_pivot} = Xm_{zero} - Xp_{offset} \quad \text{EQ 6}$$

Where $Xm_{zero\_point}$ represents the X-axis center of gravity in the coordinate system centered about the pivot point, $Xm_{zero}$ represents the X-axis center of gravity in the coordinate system measured from the edge of the platform, and $Xp_{offset}$ represents the X-axis offset between the two. Similarly, the X-axis center of gravity of the object oriented in the second position i.e., disposed at a rotation angle of θ degrees may be determined as follows:

$$Xm_{angle\_pivot} = Xm_{angle} - Xp_{offset} \quad \text{EQ 7}$$

Where $Xm_{angle\_point}$ represents the X-axis center of gravity in the coordinate system centered about the pivot point, $Xm_{angle}$ represents the X-axis center of gravity in the coordinate system measured from the edge of the platform, and $Xp_{offset}$ represents the X-axis offset between the two. In this coordinate system the center of gravity in the Z-axis may be calculated as follows:

$$Zm_{attach} = Xm_{zero\_pivot} \quad \text{EQ 8}$$

$$\sqrt{\left(\frac{1}{\cos^2\left\{\tan^{-1}\left(\frac{Xm_{zero\_pivot}\cos(\theta) - Xm_{angle\_pivot}}{Xm_{zero\_pivot}\sin(\theta)}\right)\right\}} - 1\right)} - Za$$

The (X,Y,Z) coordinates of the center of gravity of the object may be stored in a memory module such as memory 530 or file store 580 of computing system 180. In some embodiments the coordinates may be used in subsequent operations in which in which the object may be mounted on a device such as a pylon used in radar cross-section testing.

Thus, as described herein a system to determine the center of gravity of an object determines the center of gravity in an X-Y plane when the object is disposed on a platform in a first orientation.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:
1. A method comprising:
positioning an object on a test platform in a first orientation while the test platform is in a first platform position, wherein the test platform is configured with a hoist coupled to a motor to rotate the test platform via a hinge assembly;

determining a first position of a center of gravity of the object along a first axis when the object is in the first orientation, wherein the first axis is orthogonal to a second axis;

using the hoist coupled to the motor to rotate the test platform about the second axis by an angle to position the object in a second orientation, wherein the first orientation is distinct from the second orientation, and wherein the angle is selected independent of the first position and the first platform position;

determining a second position of the center of gravity along the first axis when the object is in the second orientation; and determining a third position of the center of gravity along a third axis based on the first position and the second position, wherein the third axis is orthogonal to the first axis and the second axis.

2. The method of claim 1, wherein the test platform is oriented substantially parallel to a ground surface when the object is in the first orientation.

3. The method of claim 1, wherein the test platform is oriented at a second angle with respect to a ground surface when the object is in the first orientation.

4. The method of claim 1, wherein determining the first position comprises:

receiving load data from three load cells coupled to the test platform; and determining the first position based on the load data.

5. The method of claim 1, wherein the angle is between 2 degrees and 15 degrees.

6. The method of claim 1, wherein the first axis, the second axis, and the third axis are axes of an orthogonal coordinate system.

7. The method of claim 1, further comprising determining a platform center of gravity of the test platform in three-dimensional space in the first orientation and the second orientation, wherein the third position is determined based on the platform center of gravity.

8. A system comprising:

a frame;

a test platform coupled to the frame, wherein the test platform is configured to mount an object, wherein the test platform is configured with a hoist coupled to a motor to rotate the test platform via a hinge assembly about a first axis between a first platform position in which the object is in a first orientation and a second platform position in which the object is in a second orientation, wherein the first orientation is distinct from the second orientation, and wherein the first axis is orthogonal to a second axis and a third axis;

three load cells coupled to the frame, wherein the three load cells are configured to collect load data related to the object when the object is mounted on the test platform; and a processing device coupled to the three load cells and comprising logic instruction stored in a non-transitory computer readable medium which, when executed by the processing device, causes the processing device to:

receive a first data set from the three load cells when the object is in the first orientation;

determine a first position of a center of gravity of the object along the second axis when the object is in the first orientation;

rotate the test platform by an angle to position the object in the second orientation, wherein the angle is selected independent of the first position and the first platform position;

receive a second data set from the three load cells when the object is in the second orientation;

determine a second position of the center of gravity along the second axis when the object is in the second orientation; and determine a third position of the center of gravity along the third axis based on the first position and the second position.

9. The system of claim 8, wherein the object is oriented substantially parallel to a ground surface when the object is in the first orientation.

10. The system of claim 8, wherein the object is oriented at a second angle with respect to a ground surface when the object is in the first orientation.

11. The system of claim 8, wherein the angle is between 2 degrees and 15 degrees.

12. The system of claim 8, wherein the first axis, the second axis, and the third axis are axes of an orthogonal coordinate system.

13. The system of claim 8, wherein the processing device further comprises logic instruction stored in the non-transitory computer readable medium which, when executed by the processing device, configures the processing device to determine a platform center of gravity of the test platform in three-dimensional space in the first orientation and the second orientation, wherein the third position is further determined based on the platform center of gravity.

14. A computer-based system comprising:

a non-transitory memory module;

a computer-based processing device coupled to the non-transitory memory module; and logic instruction stored in the non-transitory memory module which, when executed by the computer-based processing device, configures the computer-based processing device to:

receive a first data set from three load cells coupled to a test platform holding an object in a first orientation while the test platform is in a first platform position, wherein the test platform is configured with a hoist coupled to a motor to rotate the test platform via a hinge assembly;

determine a first position of a center of gravity of the object along a first axis in three dimensional space when the object is in the first orientation, wherein the first axis is orthogonal to a second axis;

cause the hoist coupled to the motor to rotate the test platform to rotate the object about the second axis by an angle to position the object in a second orientation, wherein the angle is selected independent of the first position and the first platform position, and wherein the first orientation is distinct from the second orientation;

receive a second data set from the three load cells when the object is positioned on the test platform in the second orientation;

determine a second position of the center of gravity along the first axis when the object is in the second orientation; and determine a third position of the center of gravity along a third axis based on the first position and the second position, wherein the third axis is orthogonal to the first axis.

15. The computer-based system of claim 14, wherein the object is oriented substantially parallel to a ground surface when the object is in the first orientation.

16. The computer-based system of claim 14, wherein the object is oriented at a second angle with respect to a ground surface when the object is in the first orientation.

17. The computer-based system of claim 14, wherein the angle is between 2 degrees and 15 degrees.

18. The computer-based system of claim 14, wherein the first axis, the second axis, and the third axis are axes of an orthogonal coordinate system.

19. The computer-based system of claim 14, further comprising logic instructions which, when executed by the computer-based processing device, configures the computer-based processing device to determine a platform center of gravity of the test platform in three-dimensional space in the first orientation and the second orientation, wherein the third position is further determined based on the platform center Of gravity.

* * * * *